United States Patent [19]

Leroux et al.

[11] Patent Number: 4,642,018
[45] Date of Patent: Feb. 10, 1987

[54] AUTOMATIC DEVICE FOR LOADING THE TOTAL VOLUME OF A TRANSPORT VEHICLE

[75] Inventors: Alain Leroux, Les Mureaux; Jean P. Fourtet, Sartrouville; Jean Hennard, Montlignon; Andre Trouillet, Vanves, all of France

[73] Assignees: Compagnie des Transmissions Mecaniques Sedis; Generale de Transport et d'Industrie; Societe Auxiliaire de Manutention Acceleree de Denrees Alimentaires & Carrosserie Trouillet, all of France

[21] Appl. No.: 761,311

[22] Filed: Jul. 30, 1985

Related U.S. Application Data

[63] Continuation of Ser. No. 503,477, Jun. 13, 1983, abandoned.

[30] Foreign Application Priority Data

Jun. 11, 1982 [FR] France ................. 82 10229
Jul. 13, 1982 [FR] France ................. 82 12267

[51] Int. Cl.4 ............... B60P 1/36; B60P 1/44
[52] U.S. Cl. .................. 414/502; 414/267; 414/540; 414/545
[58] Field of Search ............ 414/500–503, 414/518, 540, 541, 545, 267, 277, 278, 285, 286; 198/472

[56] References Cited

U.S. PATENT DOCUMENTS

| 1,837,605 | 12/1931 | Baker | 198/472 |
|---|---|---|---|
| 2,635,771 | 4/1953 | Black | 414/540 |
| 3,142,396 | 7/1964 | Pauley et al. | 414/502 X |
| 3,155,246 | 11/1964 | Baume | 414/267 X |
| 3,181,714 | 5/1965 | Kappen | 414/267 X |
| 3,575,309 | 4/1971 | Peterson | 414/503 |
| 3,688,921 | 9/1972 | Zaha | 198/472 X |
| 4,113,082 | 9/1978 | Timin | 198/472 X |
| 4,139,109 | 2/1979 | Murphy | 414/545 |

FOREIGN PATENT DOCUMENTS

| 689929 | 7/1964 | Canada | 414/267 |
|---|---|---|---|
| 837021 | 6/1960 | United Kingdom | 414/501 |
| 1552316 | 9/1979 | United Kingdom . | |

Primary Examiner—Joseph E. Valenza
Assistant Examiner—David A. Bucci
Attorney, Agent, or Firm—Sughrue, Mion, Zinn, Macpeak & Seas

[57] ABSTRACT

This device comprises movable elements 28 for forming at least one floor movable along the length of the vehicle, intermediate rails 8 for supporting the floor, fixed rails 7 for storing the floor elements 28, chains 18 for lifting and lowering the floor elements 28, and a chain 14 for shifting them and transferring them between the rails 7,8 and the chains 18 and vice-versa. The movable elements 28 of the floor are trolleys.

19 Claims, 10 Drawing Figures

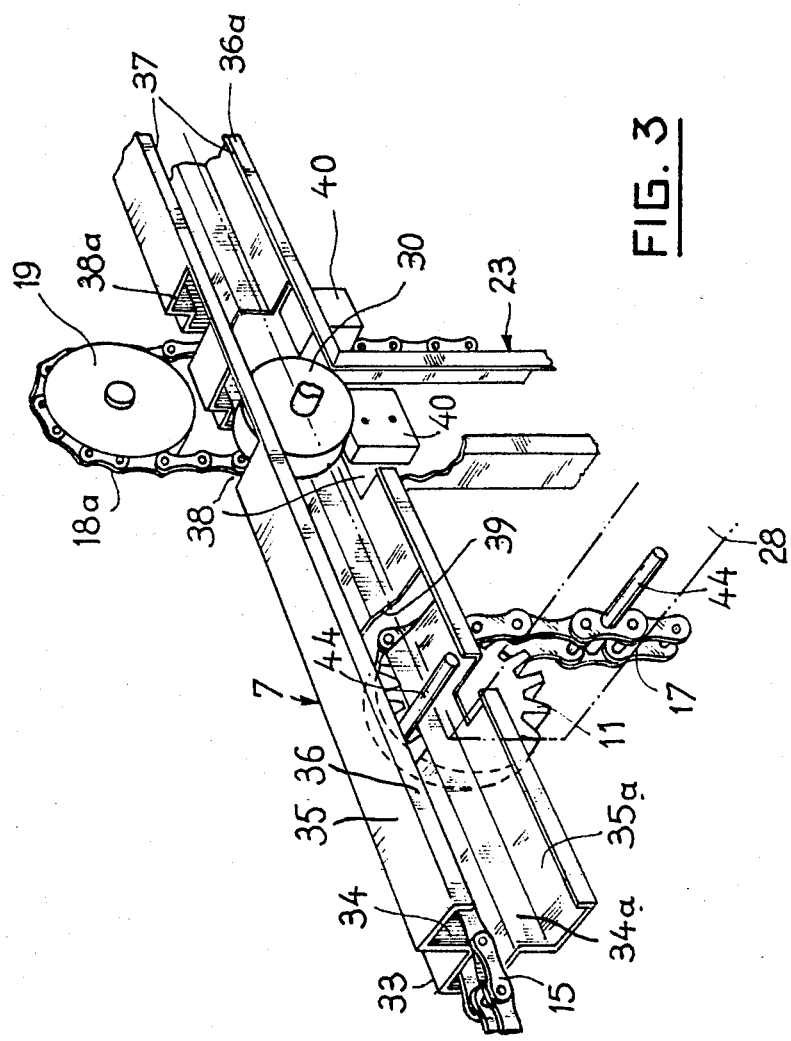

AUTOMATIC DEVICE FOR LOADING THE TOTAL VOLUME OF A TRANSPORT VEHICLE

This is a continuation of application Ser. No. 503,477 filed June 13, 1983, now abondoned.

DESCRIPTION

The present invention relates generally to the loading of freight transport vehicles and more particularly relates to a device for utilizing in a rational way the whole of the volume available in a transport vehicle.

The useful volume or payload of most freight transporting vehicles is rarely utilized at more than 30% at the present time. Indeed, apart from the case where the objects to be transported occupy almost the whole height of the available useful volume, the objects to be transported are loaded on the floor and their stacking is not always possible or easy, owing to the weight of the objects or their fragility. Indeed, when the loading is carried out by hand, it is often difficult to dispose the objects in height and, when it is carried out by lift trucks, considerable difficulties may be encountered if the objects already loaded are fragile and sometimes there are risks of an accident for the personnel inside the vehicle.

An object of the invention is to overcome these drawbacks and to provide a device which may be adapted to any freight transporting vehicle and permits the utilization of the full capacity of the vehicle in an automatic manner without requiring the presence of personnel inside the vehicle so that any risk of accident is avoided.

The invention therefore provides a device for fully and automatically loading a freight transporting vehicle which comprises movable elements for forming at least one floor on the length of the vehicle, means for supporting said floor, means for storing said floor elements, lifting means for raising and lowering said elements and means for displacing and transferring said elements between said storing means, the support means and said lifting means, and vice-versa. Advantageously, said movable floor means are trolleys.

According to one feature of the invention, said floor supporting means are formed by at least one pair of opposed horizontal rails fixed to the walls of the vehicle in at least one intermediate position on the height of said walls.

According to another feature of the invention, said movable floor comprises said trolleys engaged in said horizontal rails.

According to one embodiment, said means for storing the movable floor elements are formed by at least one pair of opposed horizontal rails fixed to the walls of the vehicle at at least one intermediate position on the height of said walls.

According to another feature of the invention, said means for supporting the movable floor elements extend from the front end of the useful volume of the vehicle along the length of said volume, said lifting means being mounted in the vicinity of the vehicle loading opening.

Said lifting means comprise two pairs of chains forming two endless loops which are spaced apart and fixed to each wall of the vehicle and extend vertically from the top to the bottom of said wall in a plane parallel to the latter and carry supports.

According to a preferred embodiment of the invention, said means for displacing and transferring the floor elements between the storing means, the support means and the lifting means comprise at least one chain forming an endless loop having a horizontal rectilinear upper portion and lower portion extending along each wall of the vehicle in the same planes as said chains of the lifting means.

Further features and advantages of the invention will be apparent from the following description with reference to the accompanying drawings which is given solely by way of example and in which:

FIG. 3 is a partial perspective view of the inside of the vehicle showing the relative arrangement of the storing and lifting means;

Figure 1:
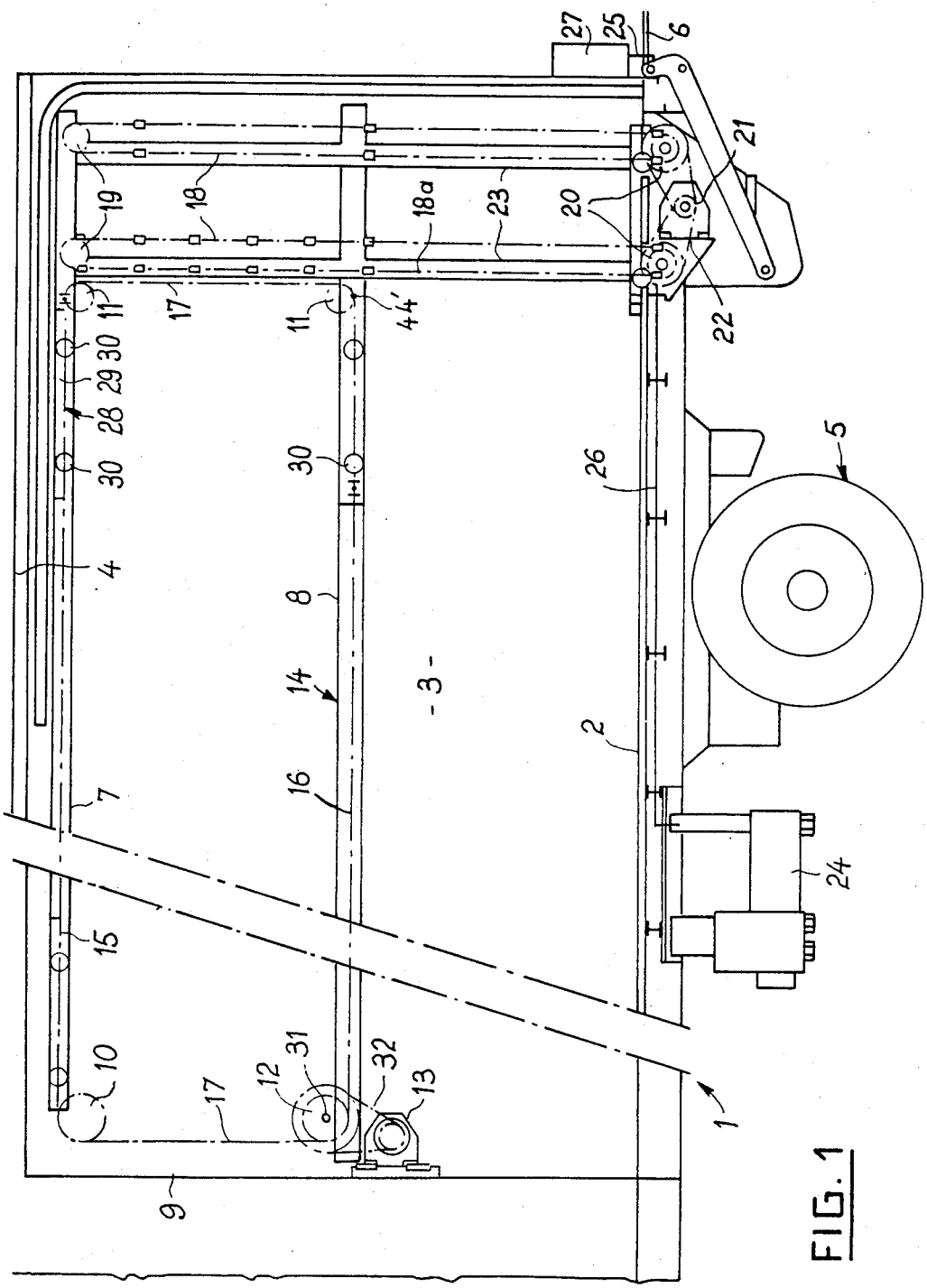
FIG. 1 is a diagrammatic side elevational view of a vehicle equipped with a device according to the invention.

With reference to FIG. 1, there is shown a freight transporting vehicle which is designated in this embodiment generally by the reference numeral 1 and is of conventional type comprising a floor 2, lateral walls 3 (only the lateral wall which is the most remote as viewed in the drawing being shown), a roof or roof panel 4, a set of rear wheels 5 and a conventional articulated movable lifting platform 6.

Fixed on each lateral wall 3 of the truck are two horizontal rails, namely a rail 7 slightly spaced from the roof 4 and extending from a point located in the vicinity of the front wall 9 through the length of the wall 3 and an identical rail 8 which extends at roughly half way up the height of the wall 3 from the front wall 9 to the rear end.

As the arrangement is identical on both walls of the vehicle, only one thereof will be described.

The spindles of the rear chain sprockets 11 are disposed at a certain distance from the rear end of the body of the truck. A chain 14 is disposed around the sprockets 10, 11, 12 so as to form a path in the shape of a closed loop having an upper horizontal portion 15 and a lower horizontal portion 16 and a vertical front portion 17 and a vertical rear portion 17, the upper horizontal portion 15 and lower horizontal portion 16 extending in the rails 7 and 8 respectively.

In the space left free between the rear vertical portion 17 of the chain 14 and the rear end of the body of the truck there are mounted on the wall 3 of the latter two endless chains 18 which extend vertically and each pass around an upper chain sprocket 19 freely rotatively mounted and around a lower chain sprocket 20 and are driven in sychronism by a motor 21 through transmission chains 22.

The vertical portion 18a of each of the chains 18, which is the most forward portion relative to the vehicle, is disposed inside a vertical guide rail 23 adjacent to the rear vertical portion 17 of the chain 14 and identical to the chains 7 and 8. The rails 23 constitute branch-connections with the rails 7 for a purpose which will be clear hereinafter.

A generating set 24 is advantageously mounted under the floor 2 of the truck and is connected by conductors 25, 26 to the motors 13 and 21 respectively and to a control panel 27 which is advantageously mounted at the rear of the truck.

A plurality of movable floor elements 28, each formed by a trolley comprising a platform 29 provided with lateral rollers 30, are disposed in end-to-end relation with their rollers 30 engaged in a lateral opening of the rails 7.

The arrangement of the rails 7, 8 and 23, and of the chains 14 and 18 along the lateral walls of the truck is such that the chains and the rails do not project inwardly beyond the limits of the rear opening of the body of the truck. The volume of the latter is thus fully cleared except for a shaft 31 on which are keyed the sprockets 12 driving the chains 14 on the two walls which must be driven in synchronism by the motor 13 through a chain 32, this shaft extending horizontally in the immediate vicinity of the front wall of the body of the truck.

Reference will now be made to FIGS. 2A to 2D in order to explain the operation of the device according to the invention.

The truck 1 shown in FIGS. 2A to 2D has been loaded in the conventional manner to the maximum extent half way up its lateral walls and the device according to the invention permits the filling of the remaining volume in the upper part of the body.

Initially, the trolleys constituting the floor elements 28 are disposed in end-to-end relation in the two upper rails 7 which constitute means for storing said trolleys and thus form a kind of double ceiling in the vehicle, an additional trolley 28a being disposed in the rail 7 extended above the lifting chains 18 with its rollers 30 in the region of the rails 23.

The lift platform 6 of the truck, having received a load C, is actuated so as to lift this load to the level of the floor 2 of the truck.

Thereafter, the operator actuates the motor 21 and lowers the trolley 28a, which is located at the top of the vertical chains 18 with its rollers 30 engaged in the vertical rails 23 on support means connected to the chains, and brings this trolley 28a onto the floor 2 of the truck. The load C is then transferred to the trolley 28a.

The operator then actuates the motor 21 in the opposite direction so as to raise the loaded trolley 28a with its rollers 30 to the level of the lower rails 8.

Figure 2A:
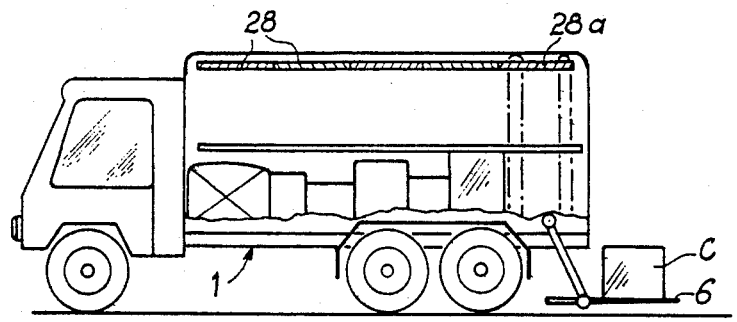
FIGS. 2A to 2D are digrammatic views similar to FIG. 1 explaining the operation of the device according to the invention.
Figure 2B:
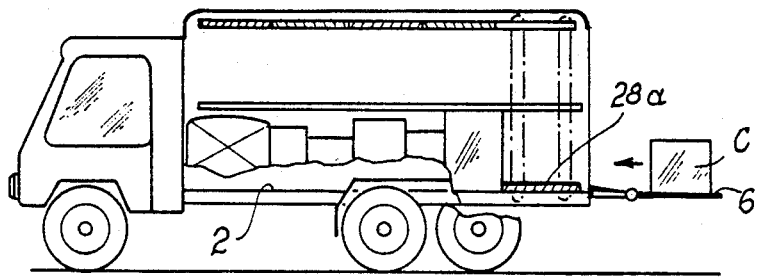
Figure 2C:
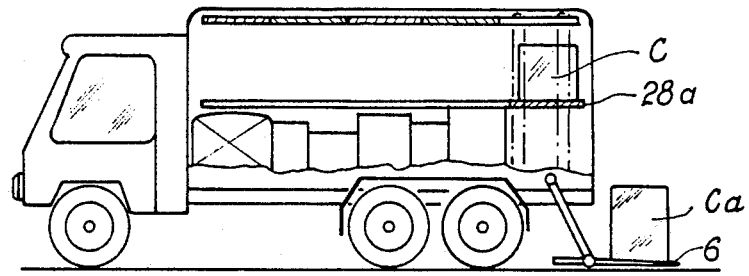
Figure 2D:
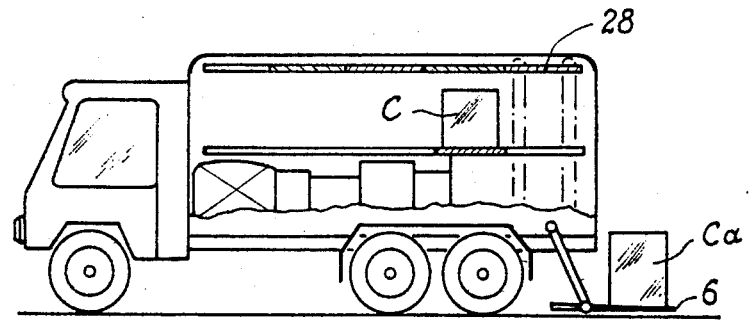

When the element 28a has reached this position shown in FIG. 2C, the transfer means constituted by the chains 14 (FIG. 1), not shown in FIG. 2C, comprising drive means, cooperate with corresponding means provided on the trolleys.

As the operator has then actuated the platform 6 so as to lower it, this platform can receive another load Ca.

The operator then actuates the motor 13 so as to drive the chains 14 in such manner that their lower portions 16 are shifted from the rear toward the front of the truck.

The drive means provided on the chain 14, engaged with the corresponding means of the trolley 28a, drive the latter with its load C in the rails 8.

The operator then stops the driving of the chains 14 as soon as the trolley 28a with its load C has cleared the path of the lifting chains 18.

In the course of this operation, the upper portion 15 of the chain has moved rearwardly and driven along therewith the trolleys 28 remaining in the upper rail 7, the movement being controlled step-by-step so as to bring the new trolley 28 in alignment with the vertical guide rails 23 in the upper part of the chains 18, this positioning being terminated as soon as the trolley 28a has cleared the path of the chains 18.

It will be understood that it is then sufficient to recommence the cycle started in FIG. 2A to lower this new trolley 28 down to the floor 2 of the truck and load the trolley with the new load Ca brought by the platform 6 to the height of the floor.

It will be understood that, after a number of successive cycles, all the trolleys except one have been driven to the vicinity of the front vertical portion 17 of the chain 14 constituting in this way a second floor midway up the height of the body of the truck, this floor being completely loaded and thus filling roughly completely the useful volume of the truck.

Figure 4:
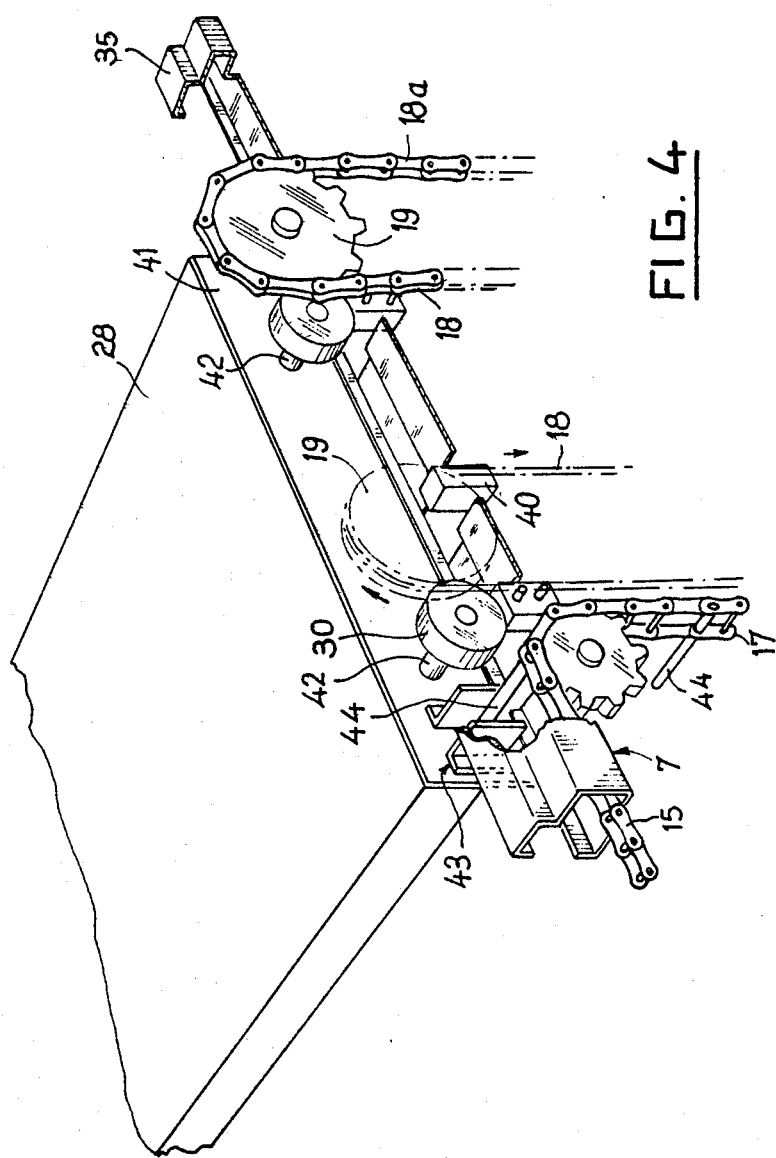
FIG. 4 is a view similar to FIG. 3 of the outside of the vehicle whose wall is assumed to be removed and showing the connection between the storing means and the lifting means and a trolley engaged therewith.

There will now be described in more detail the relative arrangement of the storing means, the support means, the lifting means and the transfer means with reference to FIGS. 3 and 4, FIG. 3 snowing the upper rail 7 seen from the same side as in FIG. 1 and FIG. 4 showing the upper rail 7 fixed to the opposite wall of the body of the truck.

As can be seen in FIGS. 3 and 4, the rail 7 is a steel section member or shape having a first portion 33 which has a U-section lying on one side the two branches 34, 34a of which are folded a first time outwardly and in opposite directions at 90° and then have a portion 35, 35a which is also folded at 90° so as to extend in the direction parallel to the branches of the portion 33 and in the same direction as these branches, the end portions of the portions 35, 35a each having a flange 36, 36a which are folded inwardly at 90° and define therebetween a lateral opening 37.

With this arrangement, the rail forms a first channel defined by the portion 33 and opening onto a second channel defined by the portions 34, 34a, 35, 35a and their flanges 36, 36a, and open adjacent to the interior of the body of the truck.

As mentioned before, the upper rail 7 extends from a point in the vicinity of the chain sprocket 10 adjacent to the front wall of the body to the rear of the latter and it is connected to the vertical rails 23.

The chain sprockets 19 are disposed above the rails 7 so that the portion 18a of the chain is located on the axis of the guide rail 23 of the lifting means, the branches 35, 35a of the rail 7 having openings 38 whose width is equal to the width of the second channel delined by the branches 35, 35a while another similar opening 38a is provided for the passage of the opposite portion of the chain 18.

It will be understood that other similar openings for the second chain 18 are also provided.

The rail 7 further comprises in the walls of the first channel 33 an opening 39 for the passage of the portion 15 of the chain 14 where it extends around the rear upper chain sprocket 11.

It will be observed from FIG. 3 that the sprocket 11 is located behind the portion 34 of the rail, and this is why it is shown partly in dot-dash lines, the opening 39 concerning the portion 34a and a fraction of the lower branch 35a, the rest ensuring the continuity of the runway for the rollers 30 of the trolleys.

FIG. 4 shows the rail 7 opposite that shown in FIG. 3 and clearly indicates the parts of the various rails which cannot be seen in FIG. 3.

The chains 18 carry support means formed by blocks 40 having rectangular sides and composed of metal and mixed to the chains by two rivets which constitute the pivot pins at the ends of a link of the chain. Advantageously, and for reasons which will be clear hereinafter, each block 40 has a width which is equal to one half of the height of the channel of the rail 7 defined by its portions 34, 34a, 35, 35a, 36, 36a and which corresponds to the identical passage of the vertical rail 23. FIG. 3 shows in dot-dash lines the outline of a trolley 28 and one of its rolling rollers 30 disposed in the rail 7 between the branches 35, 35a of the latter. It will be observed that the rollers 30 have a diameter which is just a little less than the distance between the branches 35, 35a of the rail 7.

FIG. 4 shows the end of a trolley 28 whose rollers 30 are engaged in the channel of the opposite rail so as to show the arrangement of the trolleys 28.

The two ends of each trolley are identical and that end shown in FIG. 4 will be described. Each trolley 28 has a platform at the ends of which is fixed a side wall 41 constituted by a metal plate whose upper edge is flush with the platform and whose width is greater than the thickness of the latter, the lower edge of the side wall projecting below the platform.

The spindles 42 of the rollers 30 are fixed in the side wall 41 so that the whole of each trolley is above the spindles of its rollers.

A bracket 43, formed by two L-section members disposed vertically in confronting relation so as to define a gap between their projecting flanges and thus a forked shaped member, is provided between one end of the side wall 41 and the neighboring spindle 42.

The distance between the spindles 42 of the rollers exactly corresponds to the distance between the axes of the vertical rails 23 in which the front portions 18a of the chains 18 travel.

The brackets 43 have a height in the vertical direction which is a little less than the diameter of the rollers 30 and their width, measured in the horizontal direction, is a little less than the total projection of the rollers 30. They are included within the width between the flanges 36, 36a of the rail.

The brackets 43 constitute conveying means which cooperate with finger members 44 connected to the chain 14 and which are constituted by extensions of the spindles of certain links, the distance between the finger members on the chains 14 being equal to a sub-multiple of the distance between the axes of the brackets 43 of two trolleys 28 in end-to-end relation.

The finger members 44 extend through the channels defined by each rail 7 toward the interior in the direction of the end of the trolley 28 whose rollers 30 are engaged in the rails.

The distance between the axis of the passage defined by the brackets 43 and the spindle 42 of the adjacent roller 30 is larger than the distance between the axis of the rail 23 adjacent to the descending portion 17 of the chain 14 and the spindle of the sprocket 11. Thus, when a trolley 28 is disposed as shown in FIGS. 3 and 4 with its rollers 30 in alignment with the rails 23 and each bearing on a block 40 carried by the chains 18, a finger member of the portion 15 of the chain 14 is located in a bracket 43 whose axis is located also vertically above a finger member 44' of the portion 16 of the chain 14, finger members 44 located in the rest of the length of the portion 15 being engaged in a bracket of each corresponding trolley 28 stored in the rail 7.

It will be understood that if the motor 21 is actuated in the direction for lowering the front portion 18a of each of the chains 18 of the lifting means, the element 28 (FIGS. 3 and 4) whose rollers 30 bear against the blocks 40 descend in the vertical rails 23 which guide them and prevent them from escaping laterally. Thus it is possible to lower the trolley 28a which was initially positioned at the top of the lifting means to the level of the floor 2 of the truck.

Figure 5:
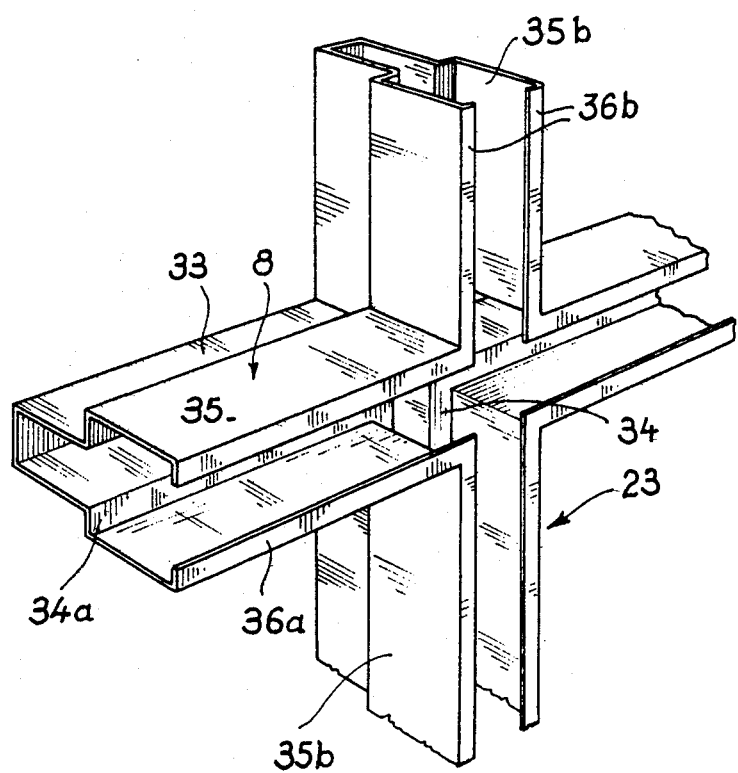
FIG. 5 shows the connection of a support rail and a rail for guiding the lifting means.
Figure 6:
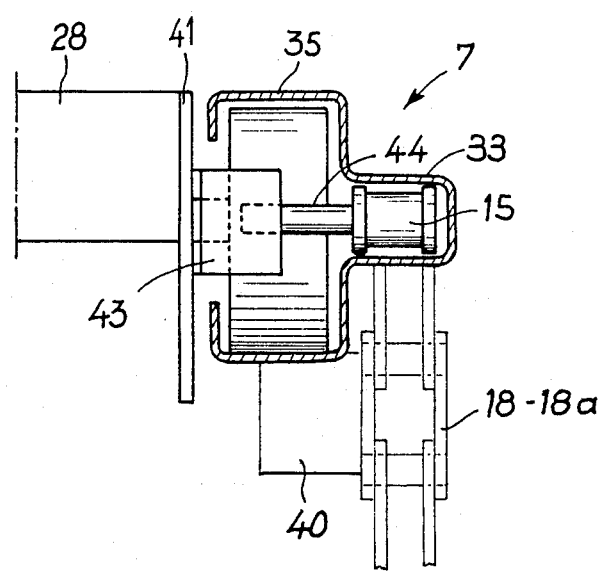
FIG. 6 is a diagrammatic end elevational view of a horizontal rail showing the passage of the rollers and brackets.

FIG. 5 shows the junction between a horizontal lower rail 8 and the front rail 23 in which the front portion 18a of each chain 18 travels.

As the rails 23 are identical to the rails 7 and 8, the parts of the rail 23 corresponding to those of the rail 18 have been designated in FIG. 5 by the same reference numerals to which the suffix "b" has been added.

It will be understood that when the trolley 28, which was lowered by the lifting means to the level of the floor of the truck, is raised to the position shown in FIG. 2c, the arrangement is such that the bracket 43 of this element is engaged on each side of the finger member 44' of the chain portion 16.

If the motor 13 is then actuated in such manner that the chain portion 16 moves forwardly, the finger member 44 engaged with the bracket of the trolley 28 located at the level of the rail 8 drives this trolley so that its rollers engage in the rails. At the same time, the finger members 44 of the upper portion 15 of the chain 14 move rearwardly and drive along therewith the trolleys 28 which are stored in the upper rail 7 and the movement of the chain 15 is automatically stopped when a new trolley 28 is engaged in the extension of the upper rail 7 with its rollers in alignment with the vertical rails 23 and supported by two blocks 40 whose spacing on the chains 18 is a sub-multiple of the distance between the rails 7 and 8.

It will be understood that the lower chain sprockets 11 are disposed relative to the lower rail 8 in a manner similar to that in which the upper chain sprockets 11 are disposed relative to the upper rail 7, but in the opposite direction, that is to say the upper flange of the part 33 of each rail 8 has a notch for the passage of the chain.

In order to ensure that the rollers of the trolleys can be brought by the blocks 40 of the chains 18 exactly in alignment with the rails 7 and 8 and also at the level of the floor, the distance between the portions 15 and 16 of the chain 14 must be equal to that between the chain portion 16 and the floor.

For the purpose of ensuring the passage of the rollers 30, the width of the blocks 40 is equal to about one half of the width of the notches 38 provided in the runway formed by the flange 35 of the rail, which notch has a dimension slightly larger than the diameter of the rollers 30. This width of the blocks is sufficient to support these rollers which are moreover maintained laterally in abutment against the walls of the vertical rails 23.

In order to ensure that the chains 18 of the lifting means are driven exactly in synchronism, the chain sprockets 20 driven by the motor 21 are keyed to shafts which extend through the floor of the truck, preferably below the latter. In this way, it is ensured that the blocks 40 remain in invariable relative positions relative to each other between the chains 18 from one side to the other of the vehicle and between each other.

It will be understood that the operations carried out by the device of the invention can be very easily controlled by electronic, electromechanical or hydraulic devices of the well-known type which are no part of the invention and will not be described in detail.

Figure 7:
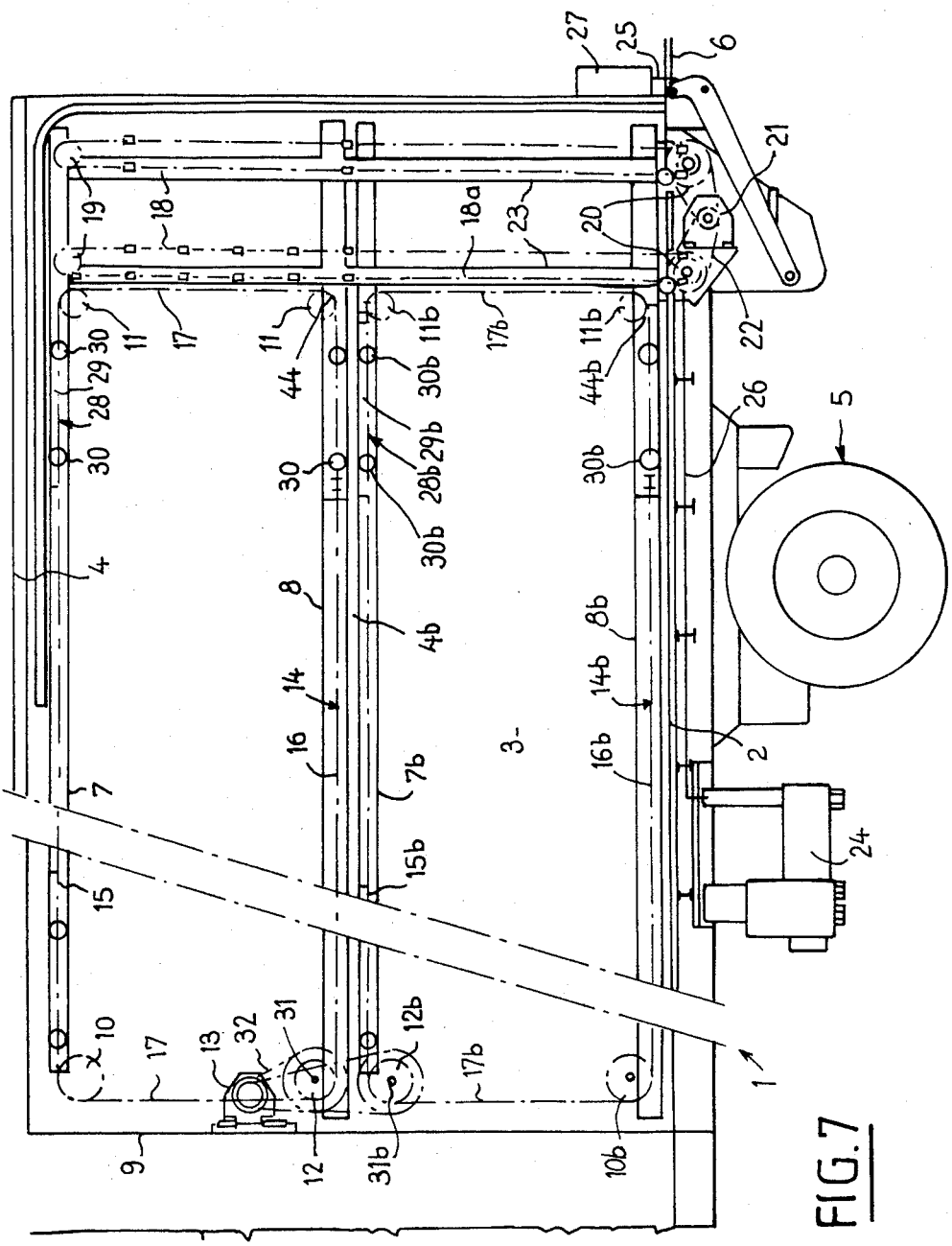
FIG. 7 is a diagrammatic side elevation view of a vehicle equipped with a device according to a second embodiment of the invention.

According to another embodiment of the invention illustrated in FIG. 7, there is disposed in the lower part of the volume of the body of the vehicle on each of the walls of this body, an endless chain disposed in a manner identical to the arrangement of the chain 14 and travelling through upper and lower parallel rails which are also identical, the upper rail, disposed immediately below the aforementioned rail 8, being connected to the vertical rails 23 in the same way as the aforementioned upper rail 7 and constituting also means for storing the elements 28. Elements in the lower portion of the vehicle body which correspond to like elements in the upper portion are identified by the same reference numberals used to identify the elements in the upper portion followed by the letter b. The lower rail may be fixed directly to the floor for receiving the loaded elements. The arrangement and the operation are identical except for the fact that a releasable coupling device must be provided at the output of the motor 13 so as to be able to drive selectively the upper chains or the lower chains so as to achieve a complete loading of the lower part or of the upper part before carrying out the loading of the other part.

It will also be understood that, although the invention has been described in its application to a motor truck, which is of particular interest especially in respect of road vehicles and vehicles effecting distributions in various places, for example, in large stores, deliveries of batches or the like, the device according to the invention may be mounted on railway cars, aircraft, road trailers or the like, or even in the holds of ships, the lifting means then operating in the opposite direction.

In the case of the loading of railway cars, this may be carried out in the transverse direction with a single unit of lifting means capable of distributing the floor elements in installations provided on the right or the left both in height and at the level of the floor.

Having now described our invention what we claim as new and desire to secure by Letters Patent is:

1. A device for automatically and fully loading a freight transporting vehicle which has a ceiling, a floor, opposed side walls (3), a front end and a rear loading opening end defining a useful volume, said device comprising: a plurality of movable floor elements (28) for forming at least one intermediate movable floor extending lengthwise of the vehicle, intermediate support means (8) adapted to support said at least one intermediate movable floor, said intermediate support means comprising at least one pair of horizontal opposed rails fixed to the opposed side walls of the vehicle in at least one intermediate position relative to the height of the walls, storing means (7) for storing said floor elements in a position where they do not support freight, said storing means comprising at least one pair of horizontal opposed rails fixed to the opposed side walls of the vehicle above the intermediate support means (8) and in a position immediately adjacent the vehicle ceiling, lifting means (18) for lifting and lowering said intermediate floor elements, and means (14) for shifting and transferring said intermediate floor elements in either direction between said storing means, said intermediate support means and said lifting means.

2. A device according to claim 1, wherein said movable floor elements are provided with roller means (30).

3. (Amended) A device according to claim 1, wherein said intermediate movable floor elements are engagable in said horizontal rails (8).

4. A device according to claim 1, wherein said intermediate floor support means and the opposed rails of the storing means extend from said front end along a length of said volume, said lifting means being mounting in the vicinity of said loading opening end.

5. A device accoring to claim 1, wherein said lifting means comprise guide rails (23) and two pairs of first chains (18) forming two endless loops which are spaced apart and fixed to each of said opposed walls and extend vertically substantially from the top to the bottom of said walls in a plane parallel to said walls, said chains passing through said guide rails and carrying supports (40) for receiving floor elements (28), said floor elements being provided with rollers (30).

6. A device according to claim 5, wherein said means for shifting and transferring the movable intermediate floor elements between said storing means, said support means and said lifting means comprise at least one second chain (14) forming an endless loop having an upper portion (15) and a lower portion (16) which are rectilinear and horizontal and extend along each of said opposed walls in the same planes as said chains of said lifting means (18).

7. A device according to claim 6, wherein said upper (15) and lower (16) portions of said second chain extend in a rail (7) of said storing means and in a rail (8) of said support means respectively.

8. A device according to claim 5, wherein on each side wall the portions (18a) of each pair of first chains of said lifting means, which are moreover located in a front part of the lifting means relative to the vehicle, extend in fixed vertical guide rails (23).

9. A device according to claim 8, wherein the rails constituting said storing means (7) and said support means (8) and the guide rails (23) of said shifting means (18) are identical section members disposed in the same plane on each of said side walls of the vehicle.

10. A device according to claim 9, wherein said section members define, in section, a first U-section chain-guide channel (33), a second U-section channel (34, 34a, 35a, 36, 36a) constituting a runway for rollers (30) of said floor elements (28) which is open on the side thereof facing the interior of the vehicle, said first U-section opening onto the second U-section channel.

11. A device according to claim 6, wherein the chain (14) of said shifting and transferring means comprise driving pins (44) for enging fork shaped means (43) extending from side of said floor elements to drive the floor elements and extending inside a runway (34, 34a, 35a, 36, 36a).

12. A device according to claim 5, wherein the chains (18) of said lifting means carry blocks (40) for supporting the rollers (30) of the floor elements (28).

13. A device according to claim 2, wherein each floor element comprises a platform (29), a lateral wall (41) fixed to opposed ends of said platform and projecting below a lower surface of the platform, and rollers carried by said lateral walls.

14. A device according to claim 13, wherein each of said lateral walls carries, in the vicinity of an end thereof, a fork shaped means (43) defining a vertical passage adapted to cooperate with drive pins (44) of the chains of said shifting and transferring means.

15. A device according to claim 1, wherein a remote-controlled motor (13) is drivingly connected to chains of said shifting and transferring means on each of said side walls to drive them in synchronism.

16. A device according to claim 1, wherein a remote-controlled motor (21) is drivingly connected to pairs of chains (18) of said lifting means to drive them in synchronism.

17. A device according to claim 15, comprising electromechanical, electronic or hydraulic means for controlling in sequence the movements of said shifting and transferring means (14) and said lifting means (18).

18. A device accoring to claim 11, wherein the distance between the drive pins (44) of the chain (14) of said shifting and transferring means is a sub-multiple of the distance between fork shaped means of two successive floor elements (28), and the device is so arranged that, when the rollers of one floor element are in alignment with rails (23) of said lifting means, at the level of a rail (7) of said shifting and transferring means, a drive pin of an upper portion (15) of the transferring chanin is located exactly in a fork shaped means of said floor element vertically above a drive pin of a lower portion of said chain.

19. A device according to claim 1, wherein said intermediate support means further includes another pair of horizontal opposed rails fixed to the opposed side walls of the vehicle in another intermediate position below said at least one intermediate position, and said storing means further includes a further pair of horizontal opposed rails fixed to the opposed side walls of the vehicle immediately below said at least one pair of horizontal opposed rails of said intermediate support means.

* * * * *